(12) United States Patent
Takahata et al.

(10) Patent No.: US 6,909,523 B2
(45) Date of Patent: *Jun. 21, 2005

(54) INFORMATION COLOR SYSTEM AND PRINTING METHOD IN THE INFORMATION COLOR SYSTEM

(76) Inventors: Toshio Takahata, 97 Yarai-cho, Shinjuku-ku, Tokyo (JP); Tsutou Takahata, 2290-144, Thunoori, Kashima-shi, Ibaraki (JP)

( * ) Notice: Subject to any disclaimer, the term of this patent is extended or adjusted under 35 U.S.C. 154(b) by 756 days.

This patent is subject to a terminal disclaimer.

(21) Appl. No.: 09/873,303

(22) Filed: Jun. 5, 2001

(65) Prior Publication Data

US 2002/0033957 A1 Mar. 21, 2002

(30) Foreign Application Priority Data

Jun. 7, 2000 (JP) ........................................ 2000-170964

(51) Int. Cl.[7] .............................................. G06K 15/00
(52) U.S. Cl. ........................................ 358/1.9; 358/516
(58) Field of Search .......................... 358/1.9, 518, 1.1, 358/516, 519, 527; 345/589, 590

(56) References Cited

U.S. PATENT DOCUMENTS 6,323,958 B1 * 11/2001 Shimizu ..................... 358/1.9
2002/0033957 A1 * 3/2002 Takahata et al. ............. 358/1.9

FOREIGN PATENT DOCUMENTS

| JP | 01043732 | 2/1989 |
| JP | 05312648 | 11/1993 |
| JP | 2000020702 | 1/2000 |

OTHER PUBLICATIONS

Color Forum Japan Proceedings Oct. 25–26, 1995. Sep. 11–12, 1996. Nov. 11–12, 1998. Nov. 10–11, 1999.
The 8th Conference on Coloring Engineering Nov. 18–19, 1991.
Kansei Engineering Feb. 17, 1997.
Bulletin of Japanese Society for the Science of Design vol. 45, No. 3, Issue 129.
The 2nd International Conference on Information and Knowledge Nov. 11–13, 1987.

* cited by examiner

*Primary Examiner*—Arthur G. Evans
(74) *Attorney, Agent, or Firm*—Lorusso, Loud & Kelly

(57) ABSTRACT

The object of the present invention is to provide an information color system in which a plurality of the computer systems can share color information therebetween and a picture having the nearly same color as color of a predetermined object or an original picture can be displayed and outputted and a printing method used in the information color system.

The information color system using a color model M which code based on the RGB spectral wavelength of the light received by the eye is applied to each color comprises a reference printed matter 1 which the color model M is printed on a transparent or a white paper, a computer device 2 having a displaying means, and an output means 5, 6 or a communication means and the displaying means is adjusted such that a picture displayed on the displaying means becomes the nearly same coloring as that of the color model M of the reference printed matter 1 in the white surrounding light, and an outputting method, a painting means, and a painted medium are selected.

4 Claims, 8 Drawing Sheets

FIG. 3
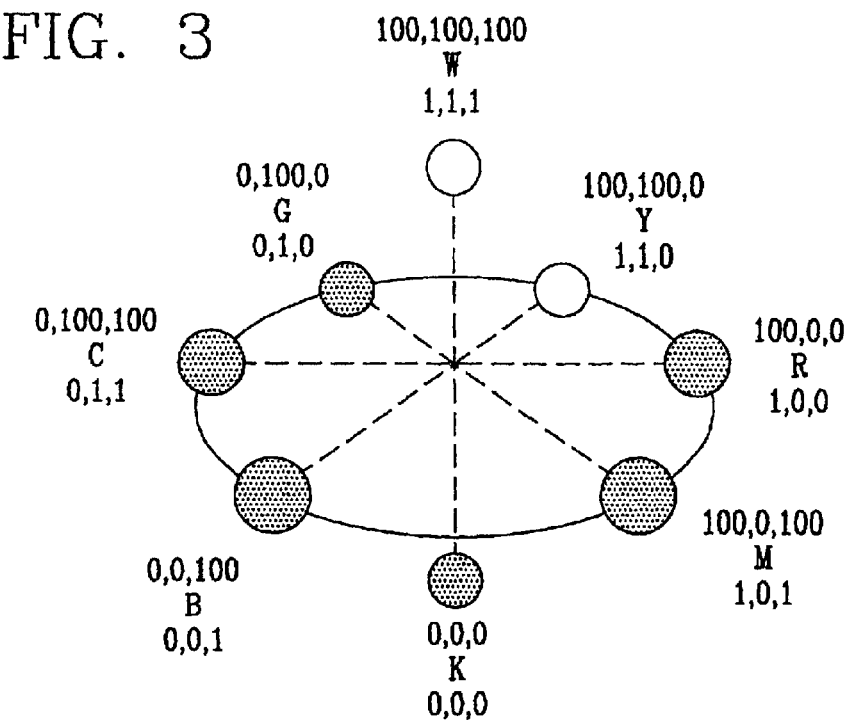
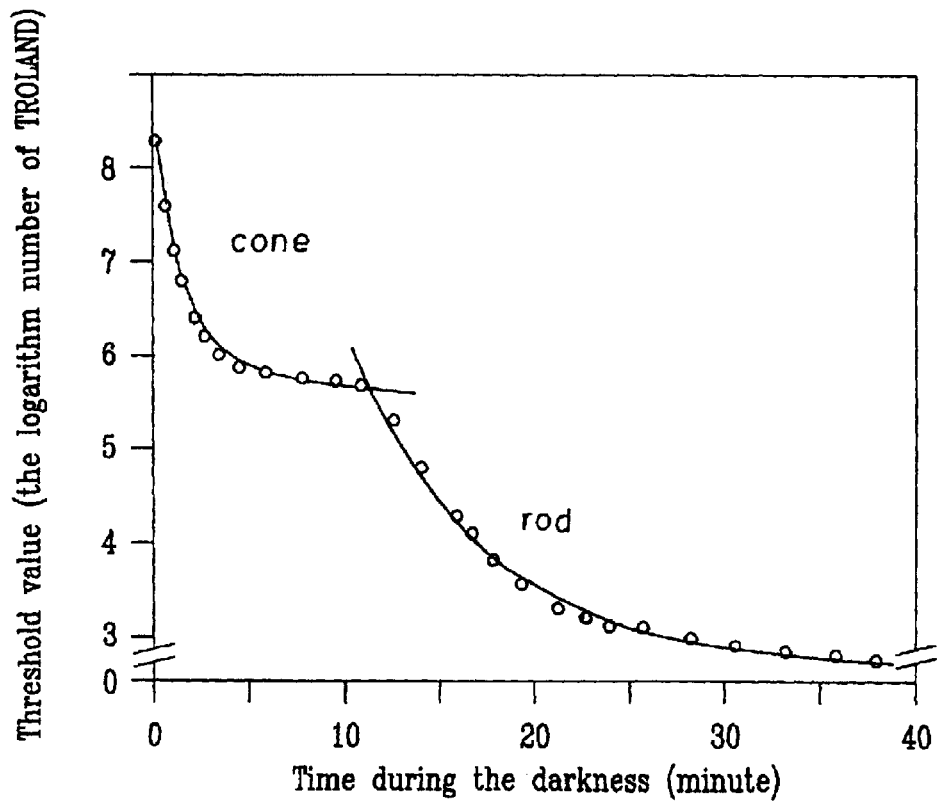
FIG. 5

INFORMATION COLOR SYSTEM AND PRINTING METHOD IN THE INFORMATION COLOR SYSTEM

BACKGROUND OF THE INVENTION

1. Field of the Invention

The present invention relates to an information color system and a printing method in the information color system which can display a picture displayed on a monitor and a picture outputted on a paper with the nearly same coloring as a predetermined object or an original picture, without taking the trouble.

2. Description of the Related Art

As the multi-media era comes, it becomes general to perform that color data are treated by using a computer and are outputted by a printer. Thereby, the current computer is loaded with an application for treating a color picture.

The application encodes color signals (RGB) inputted to the computer and enables to perform a display of the picture, an edit of the picture, or an output of the picture.

In the present state of the application, the color signals are digitized on the basis of a method employing the CIE L*a*b value (Hereinafter, referred as Lab value) which the CIE regulates, in order to encode the color signals (RGB).

However, the Lab value is a color difference value measured under the specific darkness observation condition, and there is no description for the color viewed under the solar light which is an environmental condition for a person to see an object actually. Also, different measuring value may be measured because kind of measuring device, observer, and observation condition are different.

In addition, when the color signals (RGB) are converted into the Lab value, the conversion is performed by the other algorithm or profile, and there is a case that the other Lab value may be outputted as a computed result even they are the same color signals, and then the conversion in each computer system is not be uniform Also, each of the above-mentioned computers is equipped with various kinds of color models using a Lab color space based on the Lab value. As general color model, there are HSB, HSV, and KLS.

In these color models, coordinates such as hues, brightness, and saturation are made on the basis of the Lab color space, and the colors are arranged according to each of the other methods. The different types of color models may be loaded according to the kinds or the maker of the computer.

As such, conventionally, the different color models are loaded in every computer, and the Lab values are not uniform in each computer. Accordingly, because a display, an edit, or an output of the color information is performed on the basis of the incompatible color model or the Lab value, when the color information is given and received, the information can not be shared as the same picture data between each of the computers, and there is a problem that the color difference between the picture displayed on the monitor or the picture outputted on the paper occurs.

Also, when the print is performed, RGB value is converted into CMY value, and a trial and an error which the value is set by a skilled worker or a plurality of prints are prepared and selected are repeated until the color of the manuscript and the like are precisely reproduced, thereby a large number of process and a large operation amount were needed in order to perform the output which the colors are accurately reproduced.

And, by the International Color Consortium ICC established in 1993, in the various color management system operated in the different OS, the descriptive form (format) of the device profile which can be used in common was established.

However, it is very difficult to cover the situation which the software, the device, or the network is constantly changed or expanded by the profile or the format.

SUMMARY OF THE INVENTION

Thus, the object of the present invention is to provide an information color system in which a plurality of the computer systems can share color information therebetween and a picture having the nearly same color as color of a predetermined object or an original picture can be displayed and outputted and a printing method used in the information color system.

To solve the above problem, according to one aspect of the present invention, there is provided an information color system using a color model which code based on the ratio of RGB spectral wavelength of the light received by the eye is applied to each color, at least comprising: a reference printed matter in which said color model is printed on a transparent or a white paper; a computer device having a displaying means which can display said color model; and an output means or a communication means connected to the computer device, wherein said displaying means is adjusted such that the displayed color model becomes the nearly same coloring as that of the color model printed on said reference printed matter in white surrounding light; said output means selects at least one of an outputting method, a painting means, and a painted media such that the outputted color model becomes the nearly same coloring as that of the color model printed on said reference printed matter in the white surrounding light; and the color viewed by the eye in the color model displayed on said displaying means becomes nearly the same as the color viewed by the eye in the color model outputted from said output means.

Also, the light irradiating said displaying means is adjusted such that the coloring of the color model displayed on said displaying means becomes the nearly same coloring as that of the color model printed on said reference printed matter in the white surrounding light.

It is preferable if a color chart of said reference printed matter, a color chart displayed on said displaying means, and a color chart outputted from said output means are measured by a measuring device which can measure the ratio of the RGB and are adjusted so as to become the nearly same coloring since more accurate comparison can be performed.

Also, according to the other aspect of the present invention, there is provided in an information color system using a color model in which code based on the ratio of the RGB spectral wavelength of the light received by the eye is applied to each color and comprising at least a reference printed matter in which said color model is printed on a transparent or a white paper; a computer device having a displaying means which can display said color model; and an output means or a communication means connected to the computer device, a printing method comprising the step of adjusting the color model displayed on the displaying means so as to become the nearly same coloring as that of the color model printed on said reference printed matter in the white surrounding light; selecting at least one of an outputting method, a painting means, and a painted media such that the coloring of the color model outputted from said output means becomes the nearly same coloring as that of the color model printed on said reference printed matter in the white surrounding light; inputting a predetermined picture data to said computer device; applying a code on the basis of said color model with respect to the color composing the picture data; specifying a complementary color of the color composing said picture data, on the basis of the code specified by said color model; converting the code based on the ratio of the RGB spectral wavelength into the code based on the ratio of the CMY with respect to the color composing said picture data by the specified complementary color; preparing a negative plate by said specified complementary color; and outputting the picture at the predetermined media on the basis of the code based on the ratio of said CMY or said negative plate.

BRIEF DESCRIPTION OF THE ATTACHED DRAWINGS

The above objects, other objects, features and advantages of the present invention will be better understood from the following description taken in conjunction with the accompanying drawings, in which:

FIG. 3 is an explanatory diagram showing the color model used in the information color system according to the present invention.

FIG. 5 is a graph showing threshold values of the rod and the cone of the eye of a person.

DESCRIPTION OF THE PREFERRED EMBODIMENTS

Figure 1:
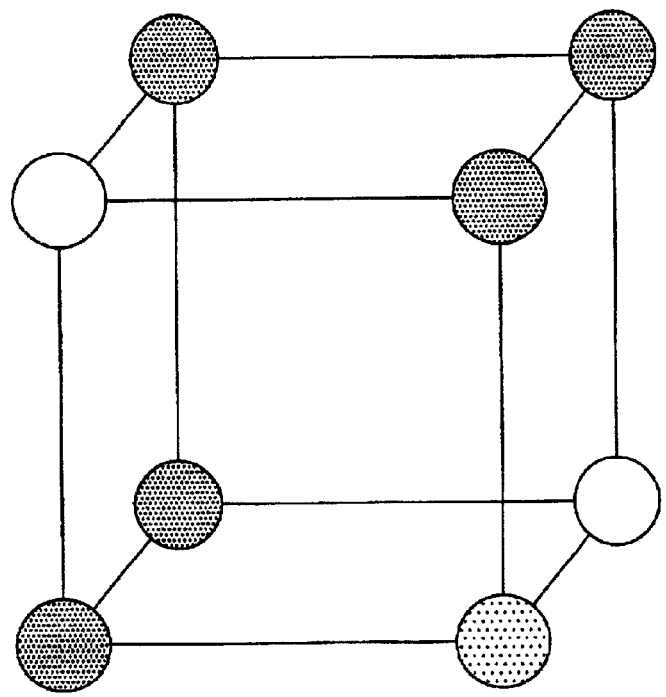
FIG. 1 is an explanatory diagram showing a color model used in an information color system according to the present invention.

The present invention relates to an information color system S which comprised such that the colors viewed by the eye are nearly same with respect to a picture displayed on a monitor 3 as a displaying means and a picture outputted from a printer 5 or a printing machine 6 as an output means.

The information color system S uses a reference printed matter 1 on which a color model M is printed, a computer 2 having the monitor 3, the printer 5, and the printing machine 6. Also, when picture data are transmitted to the other computer 2, a communication controlling section 4 is loaded in the computer 2 as a communication means.

In the information color system S according to the present embodiment, in order to make the colors viewed by the eye nearly the same with respect to the picture displayed on the monitor 3 and the picture outputted from the printer 5 or the printing machine 6, the next adjustments are needed.

First, the color model M displayed on the monitor 3 is adjusted such that the coloring thereof becomes nearly the same as the coloring of the color model M printed on the reference printed matter 1 in the white surrounding light.

Also, an outputting method, a painting means (ink), and a painted media (paper) are selected such that the coloring of the color model M outputted from the printer 5 or the printing machine 6 becomes nearly the same as the coloring of the color model M printed at the reference printed matter 1 in the white surrounding light.

By means of this, it is possible to coincide the color of the object in the white surrounding light, the picture of the object displayed on the monitor 3, and the color viewed by the eye in the picture of the object outputted from the printer 5 or the printing machine 6.

Also, in the information color system S composed of the above-mentioned composition, because the color model M which the code based on the ratio of the RGB spectral wavelength of the light received by the eye is applied to each color is used, when the color of an object or an original picture is inputted to the computer by a digital camera or a scanner, the RGB information of the picture can be used as it is, without converting into the different type. Accordingly, it is possible that the color of the object can be reproduced on the monitor or the paper accurately, without occurring a distortion and the like of the picture information by the conversion.

Also, in the color model M used in the information color system according to the present embodiment, since the code applied to each color is the numerical code based on the ratio of the RGB spectral wavelength which the color has its color, when the picture information is transmitted and received interposing the communication controlling section 4 between the plurality of the computers, it is possible that the transmission of the information can be precisely and simply performed.

Also, according to the color model M used in the information color system S according to the present embodiment, the colors composing the picture data are represented by the code by a digital numeral based on the % value of the RGB, and the code of the color having relation in the complementary color therewith can be obtained by the computation on the basis of this code.

Accordingly, in the conversion from the RGB into the CMY, it is possible that the conversion can be precisely and performed without taking the trouble. Therefore, it is possible that the output at the printer 5 and the printing machine 6 can be performed in images as true as the color of the object or the picture of the object displayed on the monitor 3.

[Embodiments]

Hereinafter, the first embodiment of the present invention will be explained with reference to the attached drawings. Also, members and arrangements to be described hereinafter are not limit to the present invention, and the various apparently different modifications may be made in the scope of the present invention.

Figure 6:
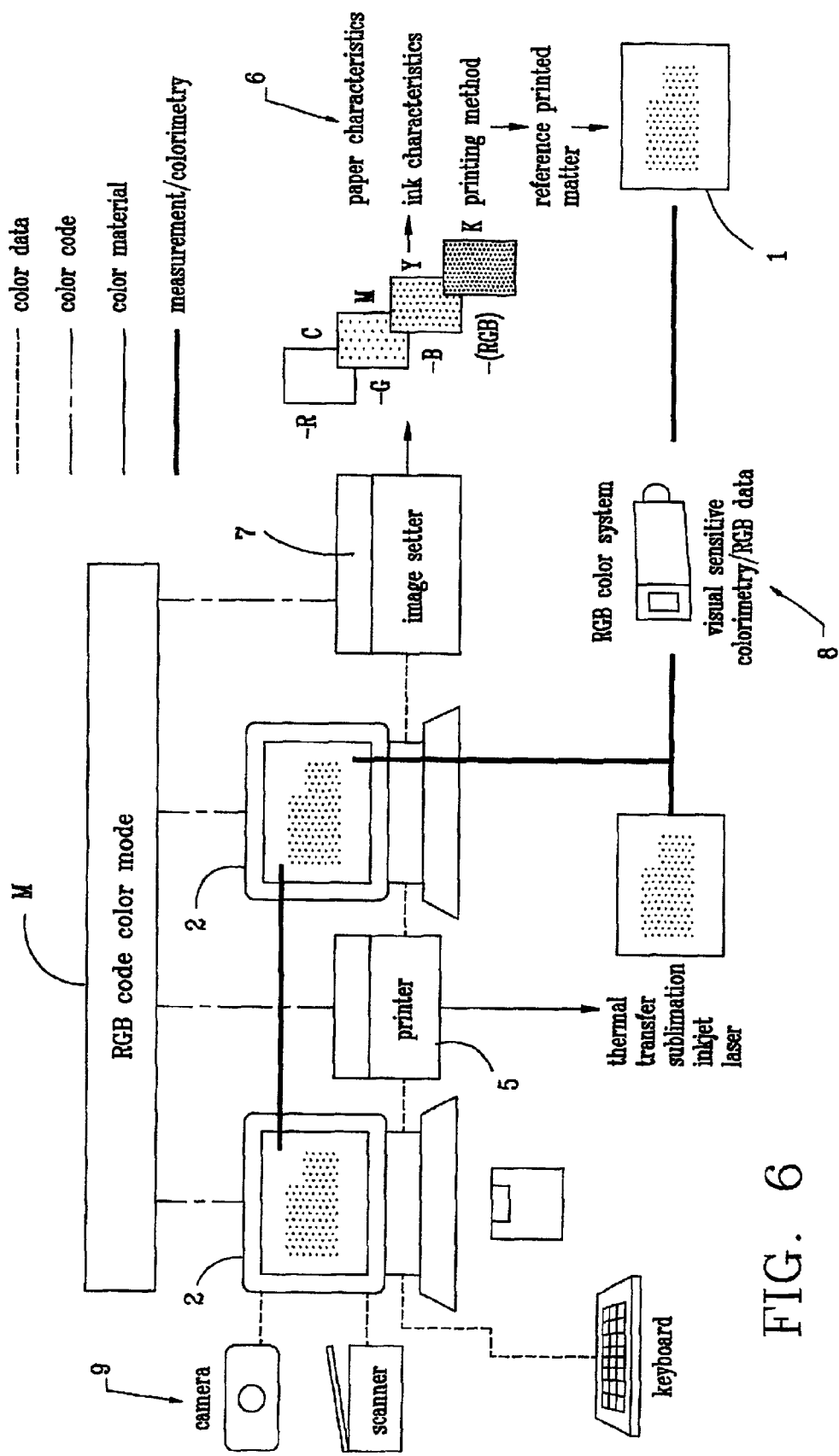
FIG. 6 is an explanatory diagram showing the scheme of the information color system according to the present invention.
Figure 7:
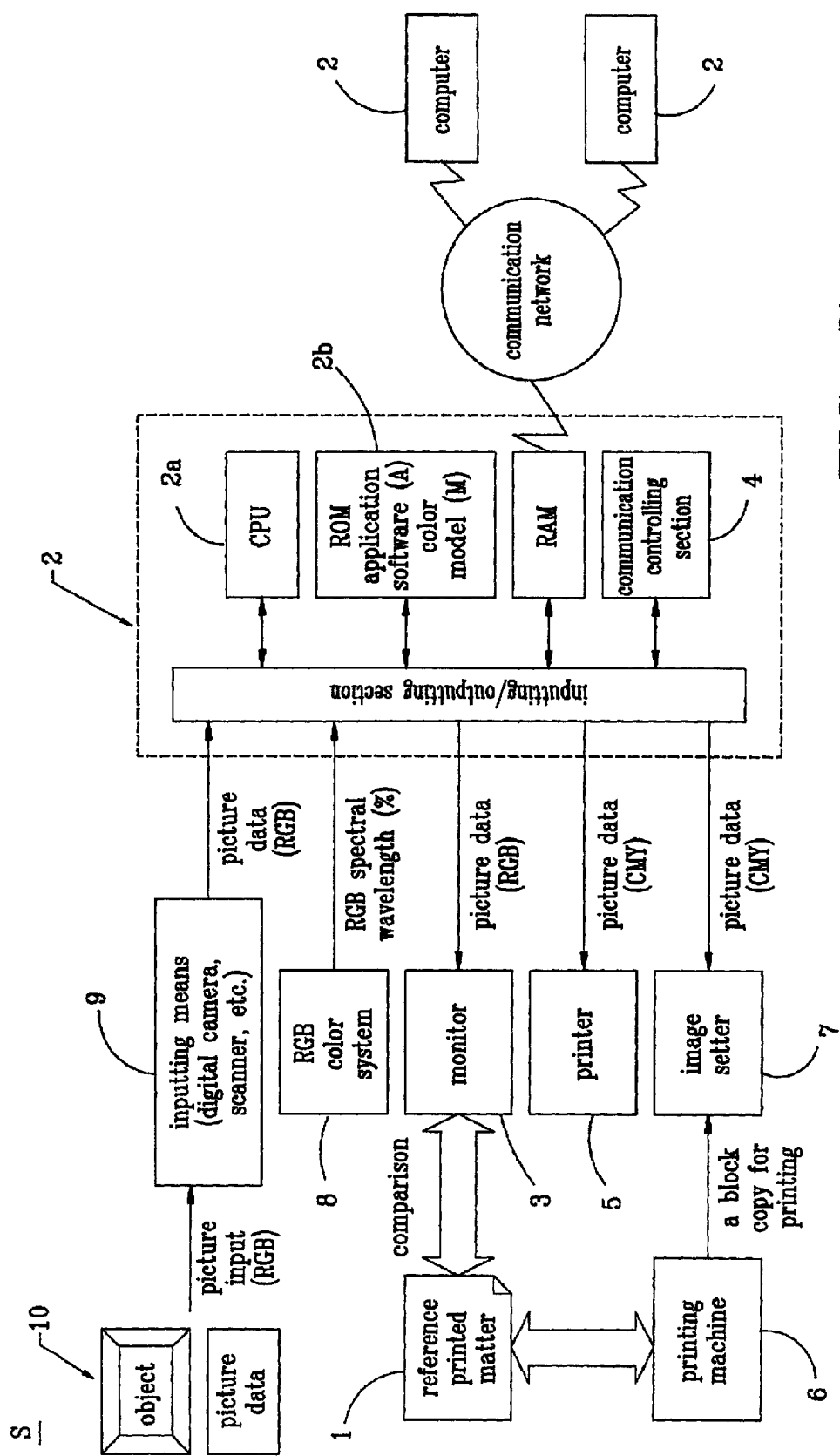
FIG. 7 is a block diagram of the information color system according to the present invention.

FIGS. 1 to 8 show an information color system and the printing method in the information color system according to the present invention, FIGS. 1 to 4 are explanatory diagrams showing color models used in the information color system according to the present invention, FIG. 5 is a graph showing threshold values of the rod and the cone of the eye of a person, FIG. 6 is an explanatory diagram showing the scheme of the information color system, FIG. 7 is a block diagram of the information color system, and FIG.

8 is a flowchart showing the flow of the picture data process in the information color system.

The present invention relates to an information color system S in which a plurality of the computer devices can share color information therebetween, a color picture displayed by a monitor 3 as a displaying means can be nearly the same as the color picture outputted by a printer 5 or a printing machine 6 as an output means, when the color picture is displayed and outputted in the plurality of the computer devices.

In the information color system according to the present embodiment, a person uses a color model M based on a system for recognizing the color, and the color information is processed using this color model M. Also, with respect to this color model M, the patent was already registered by this applicant (Japanese Patent Number 1971455). Hereinafter, the color model M used in the present invention will be described with reference to FIGS. 1 to 4.

The color model M in the present invention is constructed on the basis of a visual system which the eye of a person recognizes the color. The environment which a person substantially recognizes the color is the environment which a visible light is always filled.

The color of the object receives an irradiation of the solar light, absorbs a specific wavelength, and reflects the other in the white surrounding light which a person lives. The eye of a person captures the visible light wavelength among electromagnetic waves reflected at the various mediums and recognizes that as a color.

The intensity of the light which the eye of a person receives is vast amount, and a maximum light amount which can be viewed without accompanying the pain is powerful as about a trillion times of a minimum light amount viewed by the eye. The iris and the pupil function as the diaphragm for adjusting the vast light amount, and the retina corresponds to the change of the light amount by light adaptation/dark adaptation by two kinds of the cells such as cone/rod which the light sensitivities are different.

As shown in FIG. 5, the light came to the eye becomes the light vision adaptation with respect to the light in the extent that the threshold value is 7–8, and the cone cell reacts to the wavelength of the light and perceives the color of the object. On the other hand, with respect to the light in extent that the threshold value is 3–6, the light came to the eye becomes the darkness vision adaptation and the rod cell usually recognizes the light and darkness senses.

In other words, generally a monochromatic light of the spectrum is perfectly appeared by the wavelength and an irradiated amount thereof in physical. In case that the irradiated amount is suitable value (in case of constant brightness and the light vision adaptation), the sense of the hues corresponding to the wavelength occurs. On the other hand, when the brightness of the light becomes not more than the predetermined value (color threshold), the sense of the hue does not occur, and only the sense of the brightness occurs.

In the eyes of a person, the color of the object is recognized by accepting the light reflected at the various medium by three cone of the RGB as L wavelength, M wavelength, and S wavelength and transmitting the color information accepted by R visual material sensed in the L wavelength, G visual material sensed in the M wavelength, and B visual material sensed in the S wavelength to the cerebral visual area.

Accordingly, the color model used when the color is treated in the computer is constructed by not a concept that the color is varied by the brightness like the conventional technique, but a concept that the color is represented in the visual threshold of the eye which maintains the color sense homeostasis and is adapted to the light, and when the color model is constructed by the concept that the coloring is performed by the variation of the R·G·B signals with the constant brightness, the representation nearly closed to the color perception by the actual person's eye is possible.

The color models M used in the present invention are converted from a set of the color in the actual world into digital data. Every constituent composing the color model M is symbolized on the basis of the same rule.

The color models M makes possible to display every color in three-dimensional space and the colors are applied with the independent digital data, respectively. The color models M are combined and used in a computer system including a personal computer, a printer, and a color copy.

The color models M of the present embodiment are represented by encoding every color as binary data. The binary data applied to the colors which are represented on the color models M are obtained by digitizing the R/G/B spectral wavelength on the basis of the R/G/B spectral wavelength under the constant brightness, on condition of the coloring under the constant brightness.

Figure 2:
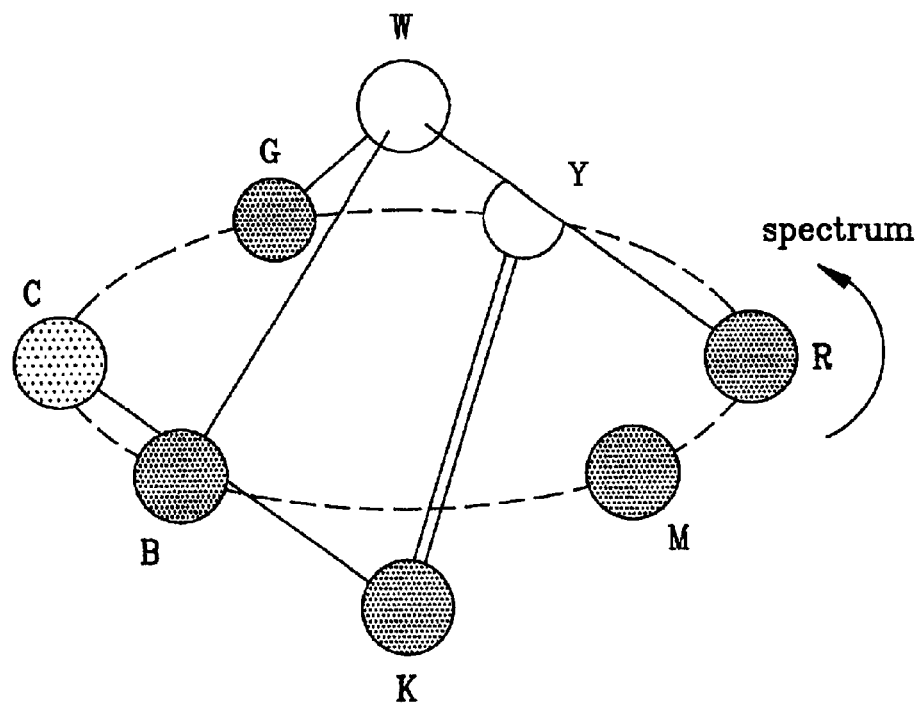
FIG. 2 is an explanatory diagram showing the color model used in the information color system according to the present invention.

FIGS. 1 and 2 are the color model M composed by the color (that is, $2^3=8$ colors) which can be represented when two-step change of 100% or 0% is performed When eight colors are simply arranged by equal interval, they are represented as FIG. 1.

In the color model M in the present embodiment, a color solid as shown in FIG. 2 is composed on the basis of the next equation, in order to perform a selection or a contrast of the color easily.

$$N^3 = N + \sum_{i=1}^{N-1} 6i(N-i) \qquad \text{Equation 1}$$

In addition, in the above-mentioned equation, N is a step which three primary colors are changed, $6i$ is the hue number of the saturation i in the color model M, and (N−1) is a changed number of three primary colors in the saturation i.

In the color model M in the present embodiment, as shown in FIG. 2, provided that the upper vertex is W and the lower vertex is K, the colors R-Y-G-C-B-M are arranged from these vertexes counterclockwise in this order in equal distance·equal interval.

As shown in the color model M in FIG. 2, when RGB three primary colors change by two steps of 100% or 0%, the eight colors are represented as mentioned above. When each color represented on the color model M is represented by the spectral wavelength of the RGB, they are represented as follows:

R (Red)=(R: 100%, G: 0%, B: 0%)
G(Green)=(R: 0%, G: 100%, B: 0%)
B(Blue)=(R: 0%, G: 0%, B 100%)
Also, W (White)=(R: 100%, G: 100%, B: 100%)
K(Black)=(R: 0%, G: 0%, B: 0%)
Also, C (Cyan)=(R: 0%, G: 100%, B: 100%)
M(Magenta)=(R: 100%, G: 0%, B: 100%)
Y(Yellow)=(R: 100%, G: 100%, B: 0%)

In the color model M in the present embodiment, with respect to the color represented on the color model M, the ratio of the RGB determining respective coloring, that is, the spectral wavelength (%) of the RGB reflected at the object is digitized as mentioned above, and is allocated to each color as the code.

When the color model M shown in FIG. 2 is served as an example, since the spectral wavelength (%) of the RGB is changed by two steps of 100% or 0%, when the color displayed on the color model M is applied with the code, two numbers 0 and 1 are used as shown in FIG. 3. In FIG. 3, with respect to each color, the spectral wavelength (%) in the upper end, and the code in the lower end are displayed.

Accordingly, W=R 100%+G 100%+B 100% is displayed as the code (1, 1, 1). Also, K=R 0%+G 0%+B 0% is displayed as the code (0, 0, 0).

Similarly, the colors are displayed as R(1, 0, 0), G(0, 1, 0), B(0, 0, 1), C(0, 1, 1), M(1, 0, 1), and Y(1, 1, 0).

Also, the object existent at the environment does not simply absorbs the light by 100% or not absorb by 100% (In other words, reflects by 100%), but also variously absorbs the light, thereby the various coloring is performed. When an absorption ratio of the light in the object is minutely set, that much more colors are displayed on the color model M.

For example, suppose that the absorption ratio of the light by the object is changed by three steps of 100%, 50%, 0%, the number of the displayed colors becomes $3^3$=27. Also, suppose that the absorption ratio of the light by the object is changed by five steps of 100%, 75%, 50%, 25%, 0%, the number of the displayed colors becomes $5^3$=125.

As mentioned above, when the absorption ratio of the light by the object is changed by three steps of 100%, 50%, 0%, each color is specified by the code combining three numbers 2, 1, 0.

Also, when the absorption ratio of the light by the object is changed by five steps of 100%, 75%, 50%, 25%, 0%, each color is specified by the code for selecting three numbers among five numbers 4, 3, 2, 1, 0.

Figure 4:
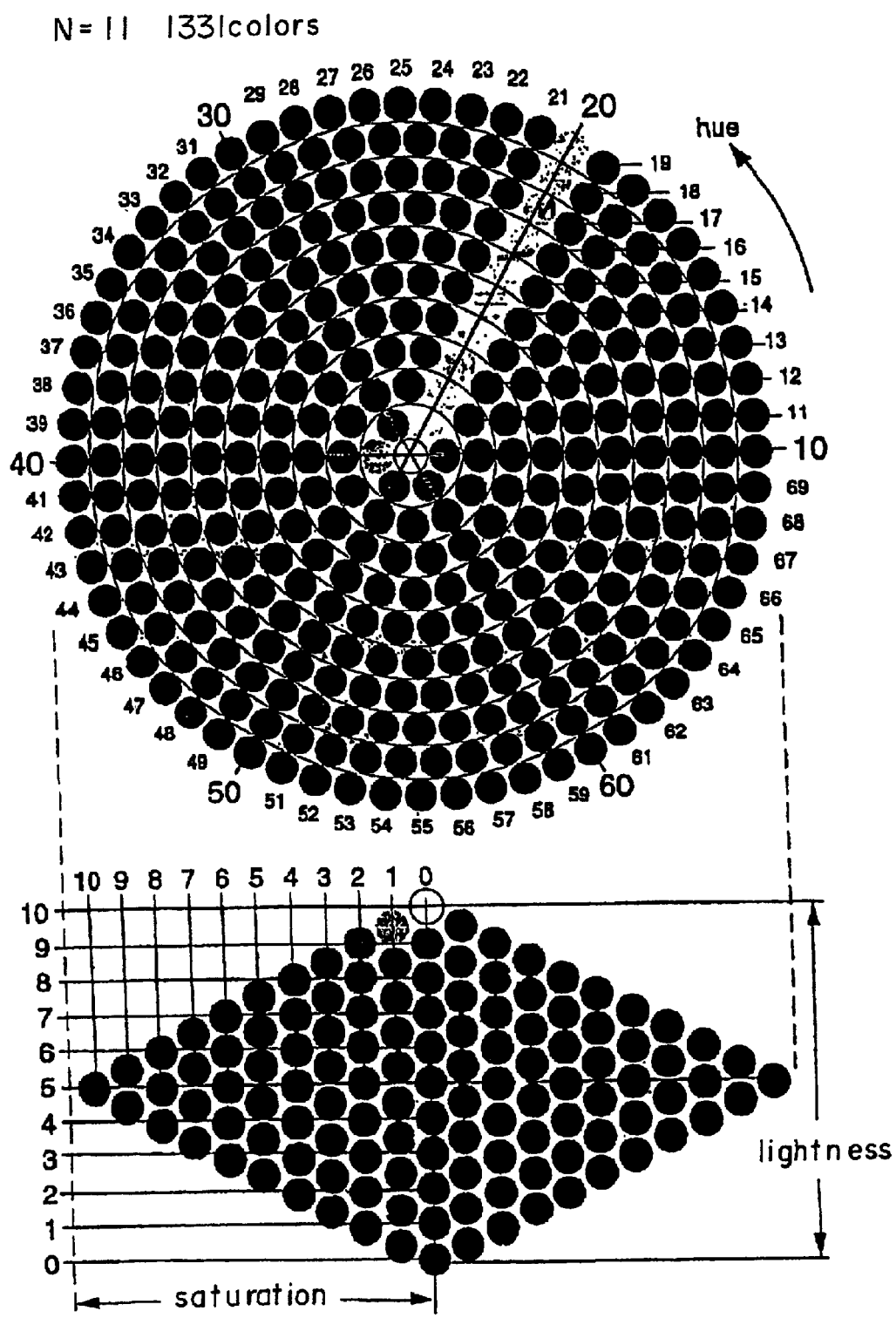
FIG. 4 is an explanatory diagram showing the color model used in the information color system according to the present invention.

When the absorption ratio of the light by the object is changed by eleven steps as a unit of 10% like as 100%, 90%, 80%, . . . , the number of the displayed colors is $11^3$=1331, and the color model M is shown as FIG. 4.

As mentioned above, when the absorption ratio of the light by the object is changed as a unit of 10% like as 100%, 90%, 80%, . . . , each color is specified by the code for selecting three numbers among eleven numbers of 0, 10, 20, . . . , 80, 90, 100.

Like this, it is possible that desired colors can be arranged on the color model M by setting the change ratio of the spectral wavelength (%) of the RGB. For example, suppose that the absorption ratio of the light by the object is changed by 1% as a unit, a million or more colors which can be represented by the present computer graphic or the color scanner and the like are represented, and each color can be applied with the coordinate value by the numeral based on the spectral wavelength (%) of the RGB.

As mentioned above, suppose that the absorption ratio of the light by the object is changed by 1% as a unit, each color is specified by the code selecting three numbers among 101 numbers 0, 1, 2, . . . , 98, 99, 100.

Like this, in the color model M in the present embodiment, every color which is represented on the color model M can be displayed as the numerical code. Since every color in the color model M is applied with the numerical code, the process in the computer can be easily performed, and it is possible that the numerical code can be used as a common color code in a plurality of the computers.

Also, in the color model M of the present embodiment, a complementary color for a predetermined color can be easily obtained. Generally, the complementary color is defined as two light colors which can make a specific white stimulation by an additive mixture in a light source color and is defined as two colors of the absorbing medium which can make an achromatic color by a subtractive mixture in the object color.

Since the color model M of the present embodiment is constructed on the basis of the visual system which the eye of a person recognizes the color, the light source color is recognized as a case that the surrounding light is darkness, and the object color is recognized as a case that the surrounding light is whiteness.

In case that the R/G/B are added at equal amount, a white stimulation is represented in the surrounding light·darkness, that is R+G+B=W. When the white stimulation is symbolized by two colors among them, they become as follow:

$$R+(G+B)=W,\ G+(R+B)=W,\ B+(R+G)=W$$

If (G+B)=C, (R+B)=M, (R+G)=Y, two colors making the white stimulation become R+C=W, G+M=W, B+Y=W, and R and C, G and M, and B and Y are complementary colors, respectively.

On the other hand, in case of the surrounding light·whiteness, an absorbing medium in the environment which the R/G/B light are already filled is W−R=C/W−B=Y, C+M+Y=K, the mixing color by two absorbing medium among them becomes $$C+(M+Y)=K,\ M+(C+Y)=K,\ Y+(M+C)=K.$$

Since M+Y=R, C−Y=G, M+C=B,

W−(C+R)=K, W−(M+G)=K, W−(Y+B)=K, and C and R, M and G, and Y and B are also in relation of complementary colors, respectively.

Like this, the complementary colors are two colors which the R/G/B light are vector-added to become W in the surrounding light·darkness, and forms a point symmetry with respect to the center of color solid. Accordingly, in the color model M, the complementary colors of the predetermined colors R, G, B become R-100, G-100, B-100. Also, in case that the code value becomes a minus, the minus is taken and the absolute value is employed.

Also, in the surrounding light·whiteness, when W−R=C/W−G=M/W−B=Y are vector-added, they becomes K. W and K are in relation of complementary colors to each other, and have a relationship of a positive and a negative.

Depending on the above complementary color relationship, a picture displayed on the monitor can be outputted as a printed matter. In this embodiment, since the RGB signals having the picture displayed on the monitor 3 is not distorted during the processing step and is converted into the CMY according to the complementary color of three primary colors/negative positive principle in a lump by using the relationship of the complementary color, it is possible that the picture can be outputted on the paper, without changing the image in comparison with the picture on the monitor.

In the present embodiment, the picture displayed on the monitor 3 and the picture outputted as the printed matter are in the relation as follows:

At the monitor, the white W is displayed=R100+G100+B100

That is, all three electron guns irradiate the light by 100%.

At the monitor, the black K is displayed=R0+G0+B0

That is, all three electron guns irradiate the light by 0%

On the printed paper, the white W is displayed=C0+M0+Y0

That is, all three primary color inks are painted by 0%.

On the printed paper, the black K is displayed=C100+M100+Y100

That is, all three primary color inks are painted by 100%

Also, the colorings of all R·G·B·C·M·Y are sequentially changed as the amount of 0% to 100% is smoothly changed.

In the above-mentioned relationship, $$W-R100=G100+B100=C100$$

that is, the negative plate of R is the C plate, $$W-G100=R100+B100=M100$$

that is, the negative plate of G is the M plate, $$W-B100=R100+G100=Y100$$

that is, the negative plate of B is the Y plate.

Like this, when the color model M of the present embodiment is used, it is possible that the picture data (RGB) displayed on the monitor can be outputted directly from the RGB data, without converting into the CMYK data.

Next, the information color system S using the color model M will be described.

As shown in FIGS. 6 and 7, the information color system of the present embodiment comprises at least a coloring source 10 (a predetermined object, an original picture, or picture data), an inputting means 9 (a camera, a scanner, a keyboard) for inputting the color information of the coloring source 10 to a computer 2, an application software A and a color model M provided in the computer 2 side, a communication controlling section 4 for transmitting and receiving the color information between the computers, a monitor 3 for displaying the color information on the computer 2 as a displaying means, a printer 5 or a printing machine 6 for outputting the picture data on the paper as an output means, and a calorimeter 8 for comparing the color of the coloring source 10, the color displayed on the monitor 3, and the color outputted from the printer 5 or the printing machine 6.

In the present embodiment, the next three sets of the coloring are already adjusted in order to output the nearly same picture as the original picture at the monitor 3, the printer 5, or the printing machine 6.

1. The color model M of the reference printed matter 1. The paper·ink·printing method are specified, and the color model M is printed by an accurate plate of an halftone area ratio.

2. The setting of the coloring of the monitor 3: The color model M is displayed on the screen of which a whiteness and a brightness are fitted to the printed paper, and the coloring thereof is adjusted so as to be same as to the coloring of the color model M of the reference printed matter 1. Also, in order to remove the difference between the reflected light and the light source light, it is possible that the color model M printed on a transparent plate can be used as the reference printed matter 1.

3. The setting of the coloring of the printer 5 or the printing machine 6: The color model M is outputted, and the outputting method, the ink, and the paper are selected such that the coloring thereof is closed to that of the color model 1 of the reference printed matter 1.

As mentioned above, in the present embodiment, a method for comparing the colors of the objects which the media and the coloring principle are different such as the reference printed matter 1, the monitor 3, the printer 5, or the printing machine 6 is performed, limiting only the color information by the three cone cells. In other words, at a state that an illuminance is constant, a state that the coloring is performed by smooth increment/decrement of the RGB signal is compared.

The above comparison may be performed by seeing the color by the eyes of a healthy person, but it is preferable that more accurate comparison can be performed by using the color system 8 for directly reading the RGB value. For example, the RGB color system 8 has a lens such as a digital camera, inputs the picture in the lens, and displays the percentage of the RGB. Also, two monitors may be provided to the RGB color system, and the picture in the inputted environment and the picture simulated in case that the picture is inputted at the surrounding light by the solar light may be displayed.

When the above-mentioned settings are completed, the picture data inputted from the coloring source 10 is performed. As the coloring source 10, there is an object for coloring a predetermined color, a picture appeared on the paper, or the picture data stored on a record medium such as a floppy disk and the like. Also, it is preferable that the picture data are prepared on the basis of the color model M of the information system according to the present embodiment, but the picture data may be prepared using the other color model.

As the inputting means, in order to the input the color of the object to the computer 2, for example, the digital camera is used as a concrete means. Also, in order to input the picture appeared on the paper to the computer, for example, the scanner is used as a concrete means.

In order to input the picture data by the digital camera or the scanner, or the picture data stored already on the floppy disk and the like, each computer is loaded with the application software A and the color model M. The system program of the application software A and the color model M is stored in a ROM 2b of the computer 2.

And, a CPU 2a is operated on the basis of the system program of the above-mentioned application A and the color model M, and the inputted picture data are displayed on the monitor 3 or the edit is performed. The application software A of the present embodiment is set with the color model M shown in FIGS. 1 to 3, and is configured that each color in the picture data can be displayed by the code based on the % value of each wavelength of every RGB.

Accordingly, with respect to the picture inputted from the digital camera or the scanner, the spectral wavelength % of the RGB of the picture is digitized and allocated to each color as the code. Also, in case that the picture prepared using the other application and the other color model is inputted, with respect to each color composing the picture, the code specifying the color which is already applied by the other method is replaced with the code by the color model M of the present embodiment.

The picture data inputted as mentioned above are displayed and printed at the computer 2 for inputting the picture, and is transmitted to the other computer 2 interposing the communication controlling section 4.

In the information color system S of the present embodiment, since the color composing the picture is displayed by the numerical code, when the transmission/reception is performed, it is possible that the transmission/reception can be accurately performed, without converting the picture data into the opposite computer. Also, it is preferable that the above color model M is loaded to each computer 2 such that the plurality of the computers can share the accurate picture data therebetween.

Also, when the picture data is outputted from the printer 5 or the printing machine 6, the process for converting the color on the monitor 3 (the color of the light: RGB) into the color on the paper (the color of the ink: CMY) must be performed.

In the present embodiment, the conversion from the RGB into the CMY is performed using the complementary color relationship in the color model M. That is, with respect to the picture inputted by the digital camera or the scanner, the code of the color composing the picture (based on the ratio of the RGB spectral wavelength) is converted into the code based on the ratio of the CMY.

At this time, with respect to each color composing the picture, the code of the color having the complementary color relationship is obtained, and the RGB of the obtained code is replaced with the CMY For example, the code of the color which is the complementary color in relation to R=(R, G, B)=(100, 0, 0) is obtained as (R, G, B)=(0, 100, 100) according to above-mentioned complementary color rule.

The complementary color code obtained as mentioned above is replaced to the CMY. In the above-mentioned case, the CMY becomes (C, M, Y)=(0, 100, 100), R is printed out.

Also, in case that the print is performed at the printing machine 6, the negative plate is prepared. At this time, the complementary color is obtained by the above-mentioned complementary color relationship, and the negative plate is prepared on the basis of this complementary color. Also, the negative plate is prepared at an image center 7 arranged between the computer 2 and the printing machine 6, as shown in FIGS. 6 and 7.

As mentioned above, in the information color system S of the present embodiment, it is possible that the conversion from the RGB into the CMY can be precisely performed without taking the trouble. By means of this, the output at the printer 5 or the printing machine 6 can be performed with the images sufficient for the color of the object or the picture of the object displayed on the monitor 3.

As mentioned above, in the information color system S of the present embodiment, the color viewed by the eye of the color of the object or the original picture, the color viewed by the eye of the picture on the monitor 3, and the color viewed by the eye of the picture output from the printer 5 or the printing machine 6 can be coincided, and the computers 2 positioned at the remote place can share the picture data.

Accordingly, for example, the information color system S is practically used at a print factory. That is, by introducing the information color system S at the print factory, each print factory can share the picture data. And, it is possible that in every print factory, the printed matter having nearly the same image can be printed, without taking the trouble.

Also, in order to represent the color composing the picture as the numerical code, in addition to using the color model M of the present embodiment, the standard of the sRGB (Microsoft corporation) which is widely used in the personal computer may be used, but in this case, the information color system S of the present embodiment must be adapted in order to the color matching, and when the print is performed, the numerical code must be converted into the code based on the color model M of the present embodiment, and the conversion from the RGB into the CMY must be performed again.

Figure 8:
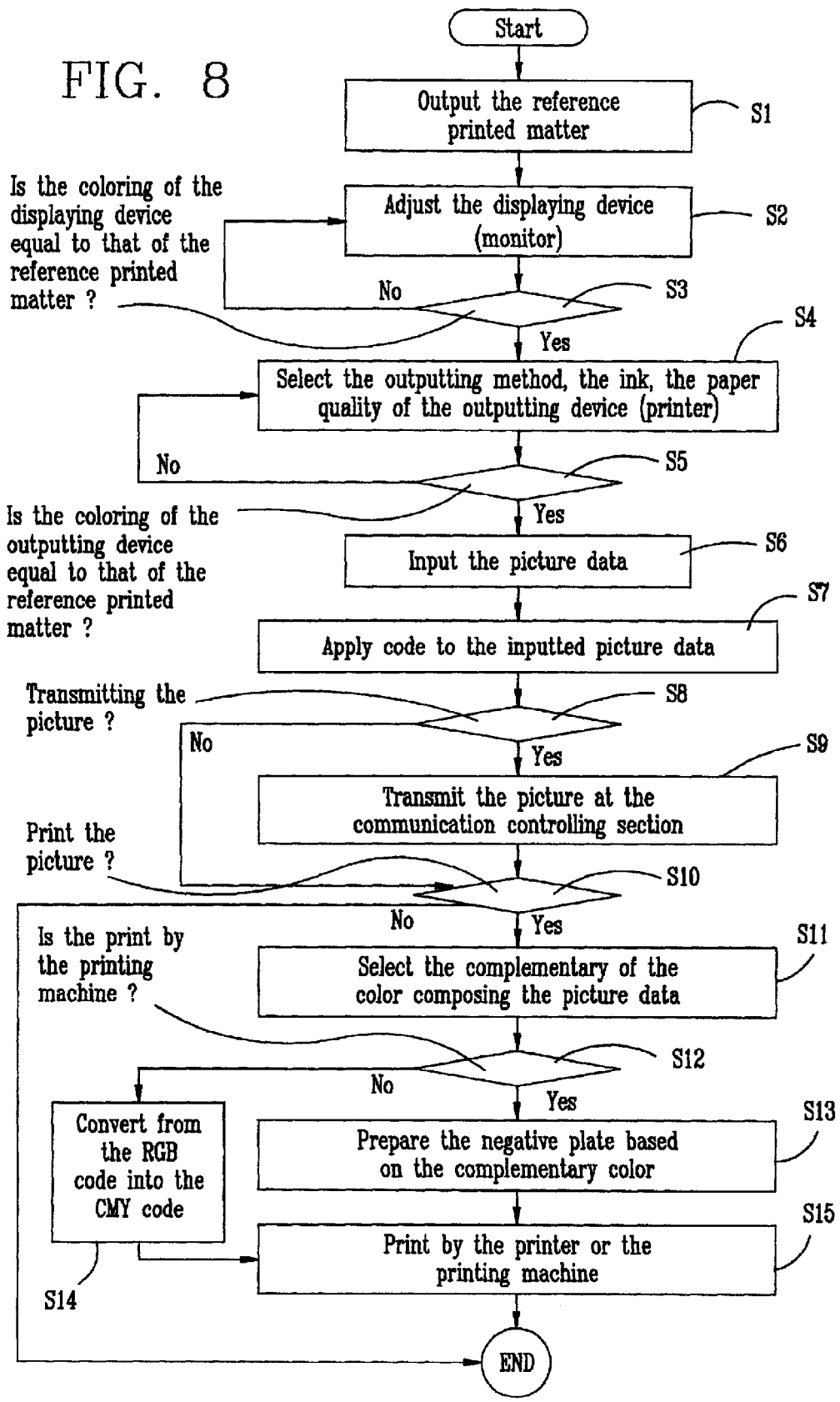
FIG. 8 is a flowchart showing the flow of the picture data process in the information color system.

With respect to the information color system S composed of the above-mentioned composition, the process of the input, the display, and the print of the picture data is shown in the flowchart of FIG. 8. Where, the flow thereof will be described according to the flowchart.

First, in step S1, the output of the reference printed matter is performed. Next, in step S2, the color model M is displayed on the monitor 3, and the coloring thereof is adjusted to coincide with the coloring of the reference printed matter 1. And, in step S3, whether the coloring of the color model M of the reference printed matter 1 is coincided with that of the color model displayed on the monitor 3 or not is determined.

When the coloring of the color model M of the reference printed matter 1 is coincided with that of the color model M displayed on the monitor 3 (step S3: Yes), the process proceeds to step S4, and the adjustment of the printer 5 or the printing machine 6 is performed. When the coloring of the color model M of the reference printed matter 1 is not coincided with that of the color model M displayed on the monitor 3 (step S3: No), the process returns to the step S2, and the process is repeated until the colorings are coincided.

In step S4, the adjustment of the printer 5 or the printing machine 6 is performed by outputting the color model M on the paper and determining the outputting method, the ink, the paper quality such that the coloring of the outputted color model M becomes coincident with that of the color model M of the reference printed matter 1.

In step S5, whether the coloring of the color model M of the reference printed matter 1 is coincided with that of the color model M printed on the paper or not is determined. When the coloring of the color model M of the reference printed matter 1 is coincided with that of the color model M output on the paper (step S5: Yes), the process proceeds to step S6, and the input of the predetermined picture data is performed by the inputting means 9 such as the digital camera or the scanner.

When the picture is inputted at the step S6, each color composing the picture data is applied with the code based on the RGB spectral wavelength %, in step S7. And, in step S8, whether the picture applied with the code is transmitted to the other computer 2 or not is determined.

When the picture is transmitted to the other computer 2 (step S8: Yes), the communication controlling section 4 transmits the picture data interposing the communication network such as an Internet and the like, in step S9.

When the picture is not transmitted to the other computer 2 (step S8: No), the process proceeds to step S10, and whether the picture is printed or not is determined. When the picture is printed (step S10: Yes), the process proceeds to step S11, and the complementary color of each color composing the picture data is specified. When the picture is not printed (step S10: No), a sequence of the process is ended.

In the step S11, when the complementary color of each color composing the picture data is specified, the process proceeds to step S12, and the whether the print is performed at the printing machine 6 or not is determined. When the print is performed at the printing machine 6 (step S12: Yes), the process proceeds to step S13, and the negative plate used in the print is prepared by an image sensor 7.

When the print is performed at the printer 5 (step S12: No), the process proceeds to step S14, and the picture data inputted to the computer are converted into the picture data for outputting from the printer 5.

In the step S14, with respect to the picture inputted by the digital camera or the scanner, the code of the color composing the picture (based on the ratio of the RGB spectral wavelength) is converted into the code based on the ratio of the CMY. And, in step S15, the print is performed by the printer 5 and the printing machine 6.

Figure 9:
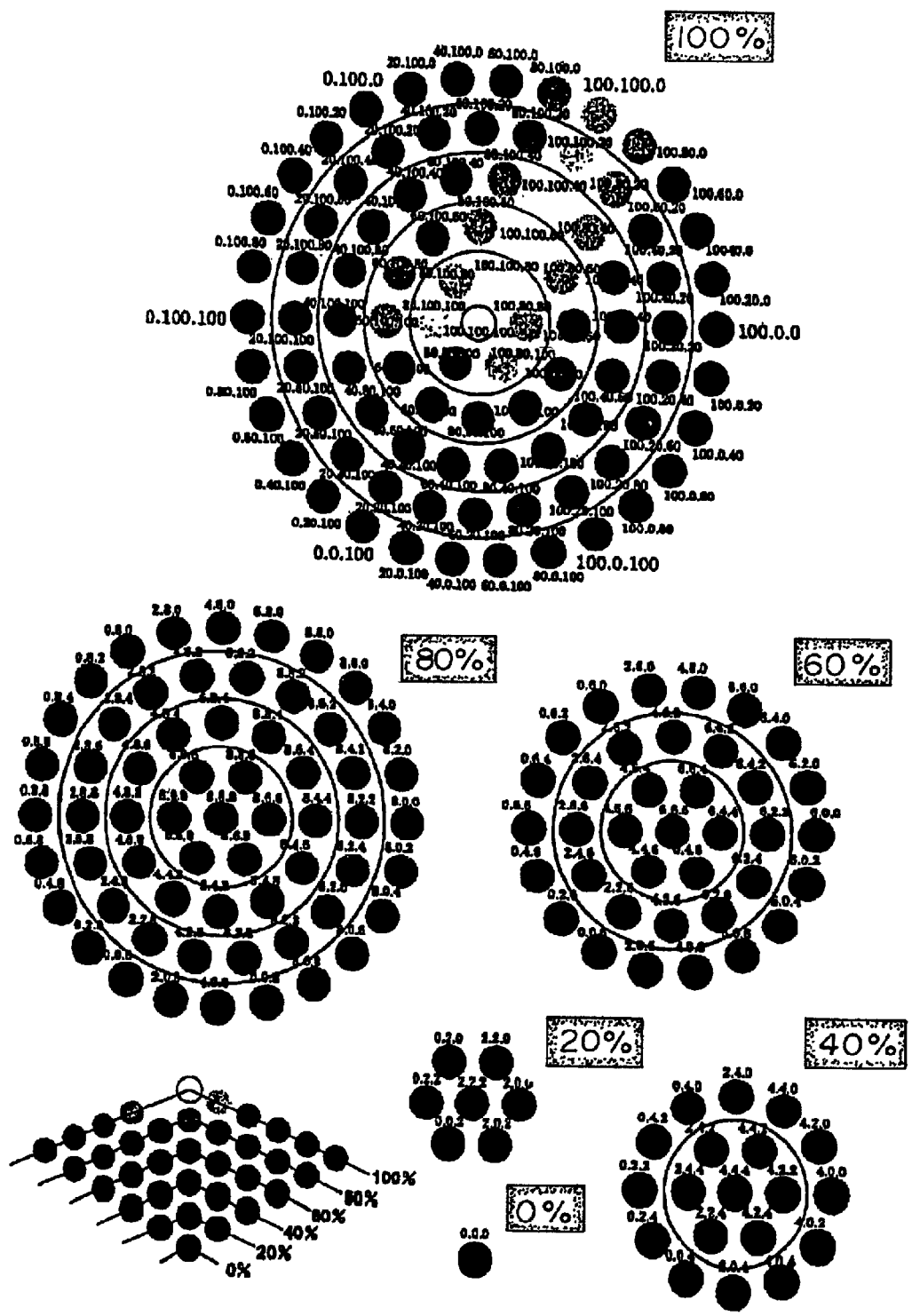
FIG. 9 is an explanatory diagram showing the color model for web.
Figure 10:
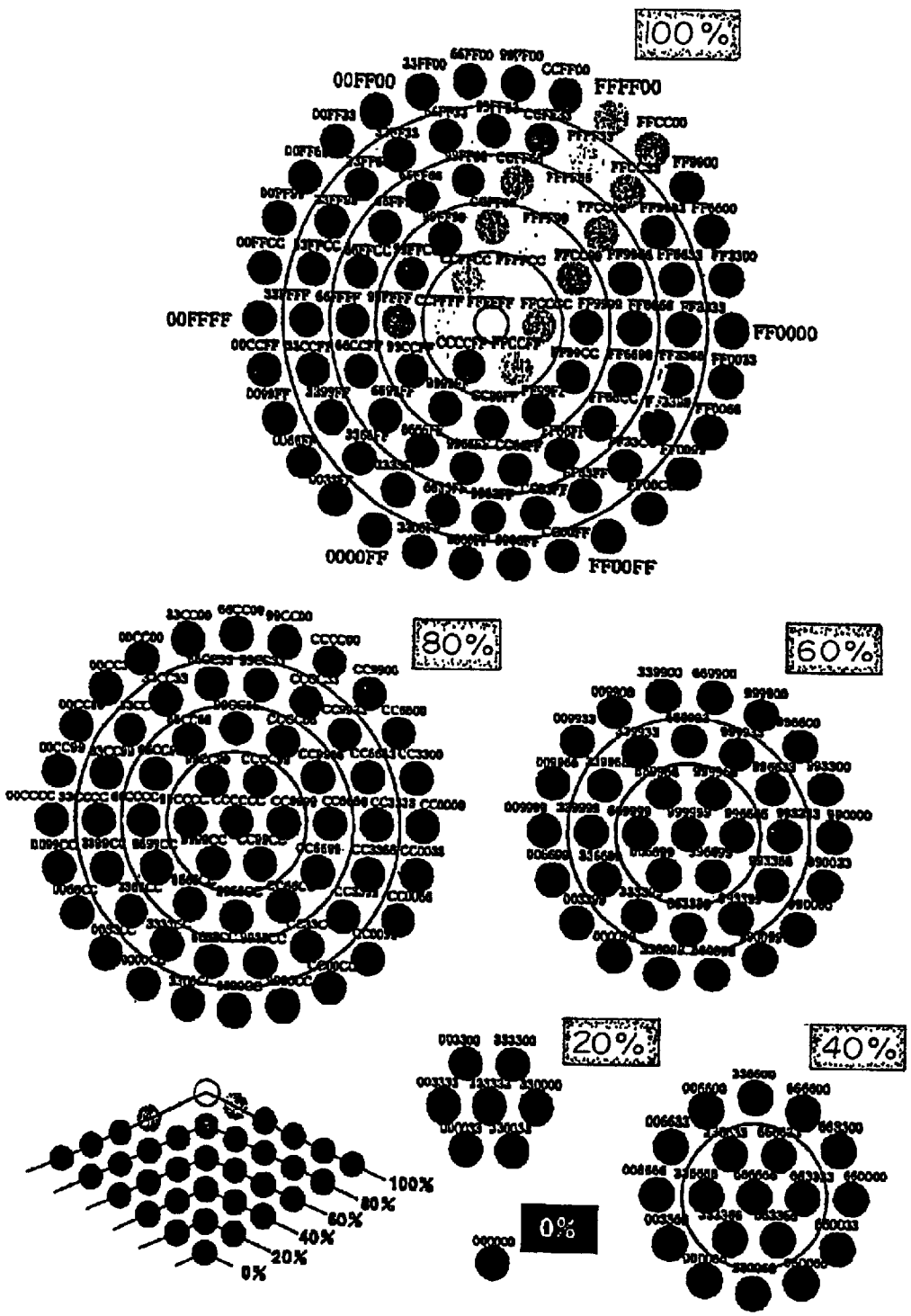
FIG. 10 is an explanatory diagram showing the color model for web.

Also, FIGS. 9 and 10 show the color model according to the present invention, in particular, the color model prepared for web. Since the information is treated as only a unit of 20% on the web, the colors are arranged as a unit of 20% in the color model. Also, with respect to the code applied to each color, it is preferable that the code which is easily treated on the web is used, as shown in FIG. 10.

By using the above color model for the web, the picture information can be transmitted and received interposing the communication network even in the remote places, and when the destination for transmitting the information has the information color system S of the present embodiment, the nearly same picture can be displayed on the monitor 3 and simultaneously, the nearly same picture can be outputted from the printer 5 or the printing machine 6.

As mentioned above, according to the information color system of the present embodiment, in the environment which the monitor and the outputting device are already adjusted with respect to the coloring of the reference printed matter, since the display or the output of the picture, or the transmission/reception of the picture data is performed using the color model which the code based on the ratio of the RGB spectral wavelength is applied to the each color, the coloring of the color of the object which is the coloring source or the original picture, the coloring of the picture displayed on the monitor, and the coloring of the picture printed on the paper by the printer or printing machine can be coincided.

Also, by using the information color system in the plurality of the positions, it is possible that the plurality of the computers can share the picture data therebetween, and the display and the output of the nearly same picture can be simultaneously performed in each position.

Also, those who are skilled in the art will appreciate that various modifications, additions and substitutions are possible without departing from the scope and spirit of the present invention. Therefore, it should be understood that the present invention is limited only to the accompanying claims and the equivalents thereof, and includes the aforementioned modifications, additions and substitutions.

What is claimed is:

1. An information color system using a color model in which code based on The ratio of RGB spectral wavelength of the light received by the eye is applied to each color, at least comprising:

a reference printed matter in which said color model is printed on a transparent or white paper;

a computer device having a displaying means which can display said color model; and an output means or a communication means connected to the computer device, wherein said displaying means is adjusted such that the displayed color model becomes the nearly same coloring as that of the color model printed on said reference printed matter in the white surrounding light;

said output means selects at least one of an outputting method, a painting means, and a painted media such that the outputted color model becomes the nearly same coloring as that of the color model printed on said reference printed matter in the white surrounding light; and the color viewed by the eye of the color model displayed on the displaying means becomes nearly the same as the color viewed by the eye in the color model outputted from said output means.

2. An information color system according to claim 1, wherein the light irradiating said displaying means is adjusted such that the coloring of the color model displayed on said displaying means becomes the nearly same coloring as that of the color model printed on said reference printed matter in the white surrounding light.

3. An information color system according to claim 1, wherein a color chart of said reference printed matter, a color chart displayed on said displaying means, and a color chart outputted from said output means are measured by a measuring device which can measure the ratio of the RGB and are adjusted so as to become the nearly same coloring.

4. In an information color system using a color model in which code based on the ratio of the RGB spectral wavelength of the light received by the eye is applied to each color and comprising at least a reference printed matter in which said color model is printed on a transparent or white paper; a computer device having a displaying means which can display said color model; and an output means or a communication means connected to the computer device, a printing method comprising the step of:

adjusting the color model displayed on the displaying means so as to become the nearly same coloring as that of the color model printed on said reference printed matter in the white surrounding light;

selecting at least one of an outputting method, a painting means, and a painted media such that the coloring of the color model outputted from said output means becomes the nearly same coloring as that of the color model printed on said reference printed matter in the white surrounding light;

inputting a predetermined picture data to said computer device;

applying a code on the basis of said color model with respect to the color composing the picture data;

specifying a complementary color of the color composing said picture data, on the basis of the code specified by said color model;

converting the code based on the ratio of the RGB spectral wavelength into the code based on the ratio of CMY with respect to the color composing said picture data by the specified complementary color;

preparing a negative plate by said specified complementary color; and outputting the picture at the predetermined media on the basis of the code based on the ratio of said CMY or said negative plate.

* * * * *

UNITED STATES PATENT AND TRADEMARK OFFICE
CERTIFICATE OF CORRECTION

PATENT NO. : 6,909,523 B2
DATED : June 21, 2005
INVENTOR(S) : Toshio Takahata and Tsutou Takahata It is certified that error appears in the above-identified patent and that said Letters Patent is hereby corrected as shown below:

<u>Title page,</u>
Item [*] Notice, delete "This patent is subject to a terminal disclaimer.".

Signed and Sealed this

Twentieth Day of December, 2005

JON W. DUDAS
*Director of the United States Patent and Trademark Office*